July 15, 1958 J. W. RIEKE 2,843,662

SHUNT CLAMPER OF THE FEEDBACK TYPE

Filed Aug. 11, 1954 3 Sheets-Sheet 1

INVENTOR
J. W. RIEKE
BY W. L. Keefauver
ATTORNEY

INVENTOR
J. W. RIEKE
BY W. L. Keefauver
ATTORNEY

July 15, 1958 J. W. RIEKE 2,843,662

SHUNT CLAMPER OF THE FEEDBACK TYPE

Filed Aug. 11, 1954 3 Sheets-Sheet 3

INVENTOR
J. W. RIEKE
BY W. L. Keefauver
ATTORNEY

United States Patent Office 2,843,662

Patented July 15, 1958

2,843,662

SHUNT CLAMPER OF THE FEEDBACK TYPE

John W. Rieke, Basking Ridge, N. J., assignor to Bell Telephone Laboratories, Incorporated, New York, N. Y., a corporation of New York Application August 11, 1954, Serial No. 449,229

3 Claims. (Cl. 178—7.1)

This invention relates to the reduction of distortion in electrical signals and in particular is directed to the reduction of low frequency distortion in television or other broad band signals.

The invention is applicable to television and will be described in its relation to such signals, although its principles are applicable to other types of signal waves.

High quality television requires the transmission with little or no distortion of signal waves having band widths of several megacycles and including in their video or non-carrier form important low frequency and direct-current components. Much attention has been given to this problem and classes of circuits known as D.-C. restorers or reinserters and clampers have been devised to compensate for the loss or distortion of either or both of the direct-current and low frequency components.

A principal cause of such distortion is the relative inability of a broad band transmission medium to transmit low frequencies and direct-current components. D.-C. restorers represent an early approach to the problem but are suitable only for the restoration of direct current and very low frequencies. Clampers represent an improvement over D.-C. restorers since they are suitable not only for restoring direct-current components but also for reducing low frequency distortion. A more detailed discussion of the problem and previous solutions may be found in an article entitled "Clampers in video transmission," by S. Doba, Jr., and applicant, 69 Trans. A. I. E. E. 477, 1950.

Previous clampers have been able to achieve a significant reduction in interference up to only a hundred cycles or perhaps a few hundred cycles. Equalization down to a few hundred cycles is therefore required to maintain high quality transmission with such clampers. A feature of the present invention is that significant interference reduction up to several thousand cycles is obtained, and theoretically at least, may be obtained up to half line frequency, thus relieving the burden imposed on the equalizers.

An illustrative embodiment of the present invention described in detail below comprises an improved clamper and falls in the subclasses of clampers known as shunt clampers of the feedback type. Television clampers, in general, sample the departure of the television wave from a reference value, usually the tips of the synchronizing pulses. This detected departure, known as the envelope distortion, is then subtracted from the transmitted signal so as to reduce the departure. Since this departure can be detected only periodically, the derived envelope distortion is in fact a quantized version of the actual distortion so that when it is subtracted from the transmitted wave form, some distortion remains. Heretofore, this residual distortion has been considered unavoidable whether the clamper was of the series or shunt type.

A principal object of the present invention is to reduce this residual distortion.

It is also an object of the invention to reduce the low frequency distortion in a television signal.

Another object of the invention is to extend the improvement obtained by clampers to higher frequencies without requiring the introduction of delay into the transmitted signal.

In accordance with an illustrative embodiment described below, the residual distortion which arises from the quantized nature of the detected envelope distortion is reduced in a shunt type clamper by the introduction of a low frequency gain boost in the feedback circuit of the clamper. Sufficient gain at the low frequencies is added so that discrimination is obtained against the higher frequency residual distortion.

A feature of the invention is that this discrimination against high frequency residual components is obtained without broad band delay in the signal path, which would be difficult to realize over a broad band signal spectrum.

Other features and objects of the invention may be more fully understood by referring to the following description which should be read in connection with the accompanying drawings, in which:

Fig. 3 illustrates a modification of the clamper of Fig. 1 in accordance with principles of the invention while

Figure 1:
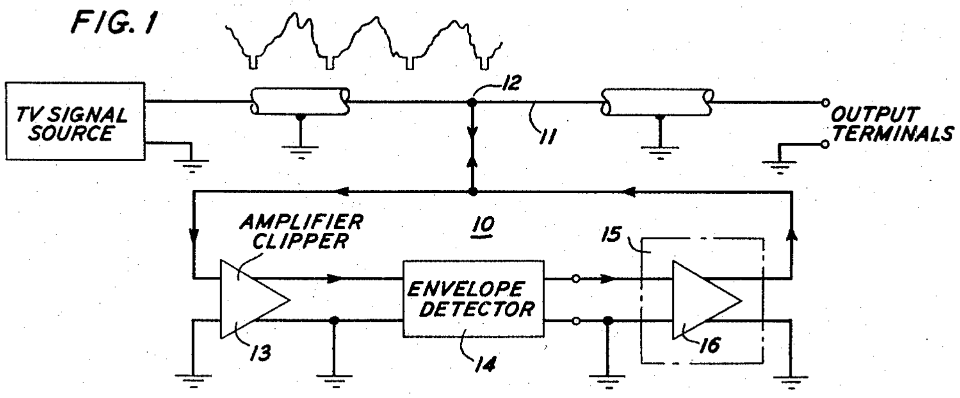
Fig. 1 is a diagram, in block schematic form, of a clamper of the shunt feedback type.

A shunt clamper 10 of the feedback type is illustrated in Fig. 1. This type of clamper is discussed in the above-cited article and is also described in a patent of mine, 2,630,486, March 3, 1953. In this type of clamper, there are no clamping elements in series with the transmission line 11. Instead, the clamper has its input and output circuits bridged at a common point 12 across the transmission line. Associated with the clamper is a feedback path including an input amplifier 13, an envelope detector 14, and coupling elements 15 illustrated in the diagram as a further amplifier 16 for coupling the detected envelope with proper phase and amplitude back to the input amplifier 13 and transmission line 11.

Figure 2:
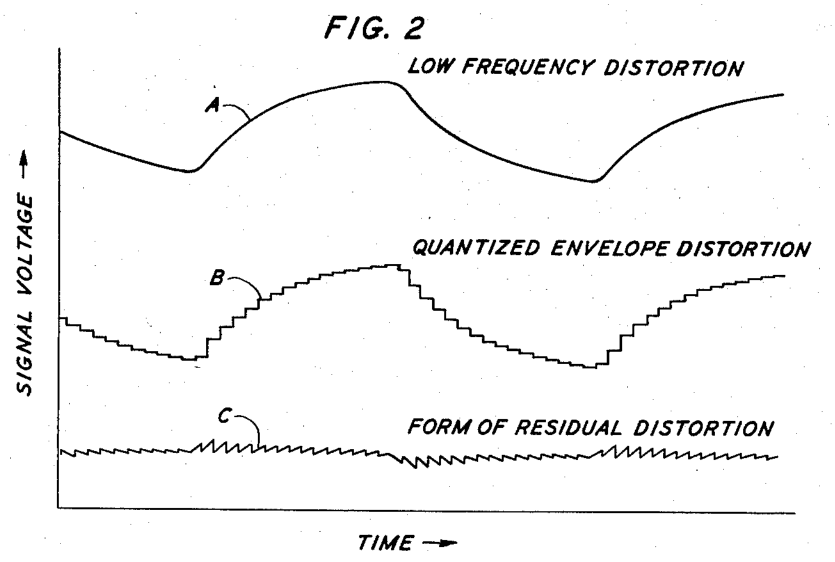
Fig. 2 illustrates various wave forms which are helpful in understanding the invention.

A typical type of distortion is illustrated by the wave form A in Fig. 2. This is a typical low frequency distortion wave such as might be due to a single resistance-capacitance cut-off acting upon a video wave form which contains a square wave of low frequency. Wave form B in Fig. 2 shows the wave which is derived by the envelope detector by sampling the low frequency wave at a finite rate, namely, at the line frequency. Wave form C shows the form of the distortion which remains when the wave B derived by the detector is subtracted from the low frequency wave, wave form A.

The residual distortion, wave form C, produces a characteristic distortion pattern which determines the limit of improvement available from the use of clampers. It may be noted here that this residual distortion also would result if a series type clamper were used, since the detected envelope in the series case as well as in the shunt case comprises merely a quantized version of the actual low frequency distortion. This form of residual distortion is equivalent to "quantizing noise" in pulse systems of signal transmission. It comprises a multitude of sideband spectra about harmonics of the sampling frequency. The residual distortion, therefore, consists of frequencies high compared to the input distortion wave. This frequency difference between the input distortion and the residual distortion is exploited by this invention.

In accordance with the present invention, the lower frequencies of the detected envelope in a feedback clamper are amplified by a greater amount than the higher frequency components of the envelope. One way of accomplishing this is illustrated in Fig. 3 which shows a coupling stage 15 for a shunt clamper of the type illustrated in Fig. 1.

Figure 3:
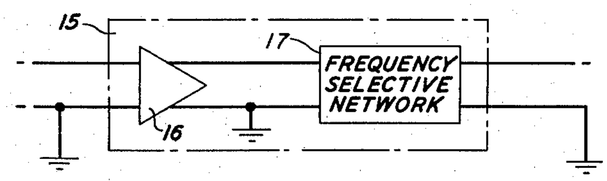
Figure 3A:
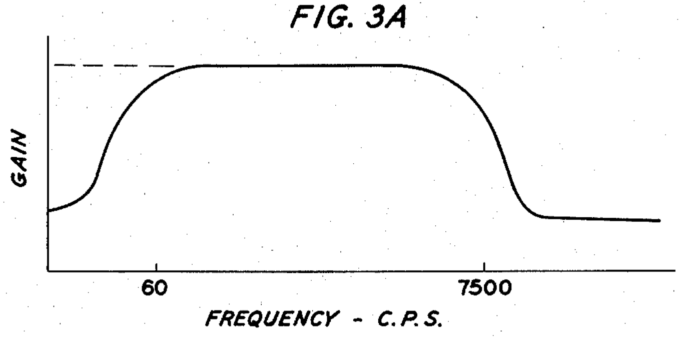
Fig. 3A illustrates the transmission characteristic of the circuit elements 15.

In Fig. 3, the coupling stage 15 comprises an amplifier 16 plus a frequency selective network 17 having a transmission characteristic such that the combined amplifier 16-network 17 characteristic is that illustrated in Fig. 3A. This combination provides a gain boost in the feedback loop over a limited band up to approximately half line frequency. If desired, the characteristic may be flat down to and including direct current (dotted line) or may fall off below 60 cycles per second (solid line), i. e., it may have either a low pass or band pass characteristic.

An alternative arrangement is used in the clamper to be described in detail. In this arrangement, illustrated in Fig. 4, the output of the detector is divided into two parallel paths, one of which transmits the envelope in a 1:1 ratio over the entire band and the other of which provides the low frequency gain boost. The important fact in either arrangement is that the low frequencies are amplified relative to the higher frequencies, where "low" frequencies are defined as those below one-half line frequency (7.9 kilocycles with the present standard television signal). In other words, gain can be provided in both parallel paths in Fig. 4, if desired, so long as the gain provided in the low frequency coupling path is high relative to the gain in the broad band coupling path.

Figure 4:
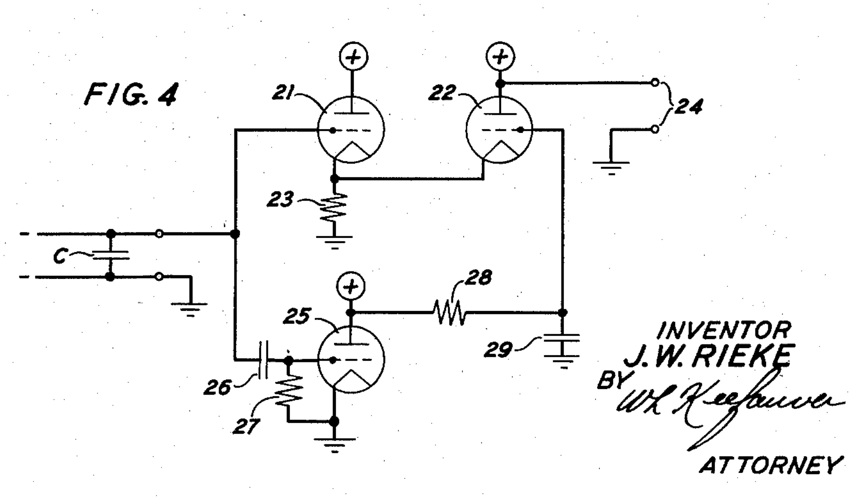
Fig. 4 shows an illustrative circuit which may be employed as the circuit 15.

In Fig. 4, the quantized envelope, wave form B in Fig. 2, appears as a voltage on the condenser C. This voltage is direct coupled to a triode 21 whose output is coupled to an output tube 22 by a common cathode resistor 23. By the nature of these connections, the quantized envelope is transferred to the clamper output terminals 24.

Extra gain for the low frequencies is provided by a triode 25 to which the quantized envelope is A.-C. coupled through a capacitor 26. The output of this tube is applied to the grid of the output tube 22 where it combines in phase with the components directly coupled through the tube 21. The coupling capacitor 26 and grid leak resistor 27 provide a low frequency cut-off for the amplifier 25 in the vicinity of ten cycles. A high frequency cut-off to this added gain is provided by the resistor 28 and shunt capacitor 29 connected to the output of the amplifier. These elements are proportioned to decrease the gain of the amplifier at frequencies above half line frequency. The net result of this circuit is to produce at the output terminals 24 a corrected quantized envelope in which the low frequencies have been boosted relative to the upper frequencies, as shown in Fig. 3A, to the end that residual distortion of the clamper as a whole is reduced.

Figure 5:
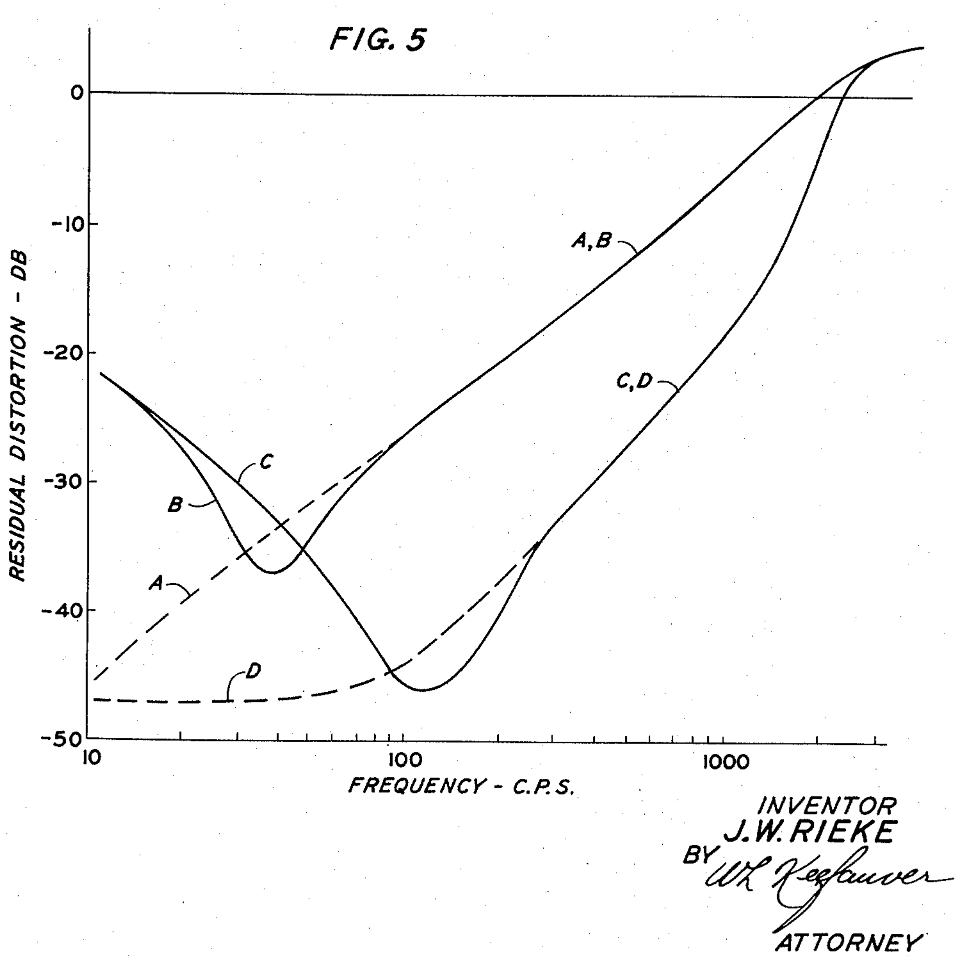
Fig. 5 shows various clamper characteristics to illustrate the improvement which may be obtained in accordance with the invention.

With the better prior art clampers, whether of the series or shunt type, the benefits of clamping were achieved primarily below 2000 cycles per second at a rate of roughly six decibels per octave, as illustrated in Fig. 5 by curve A. Curve B shows the modification in the basic clamper distortion suppression characteristic produced in feedback type structures employing capacitors to couple the clamper to the transmission line. At the very low frequencies, the impedance of the coupling condenser limits clamper effectiveness.

Curve C shows the additional suppression of residual distortion obtainable with the additional gain boost at low frequencies provided in an embodiment of this invention. Curve D shows additional improvement which is possible if the line coupling condenser is avoided or if the input and output lines are coupled separately through condensers to the clamper. The maximum suppression shown at low frequencies in curve D is limited only by the available feedback gain which can be set arbitrarily depending upon overall performance requirements.

Figure 6:
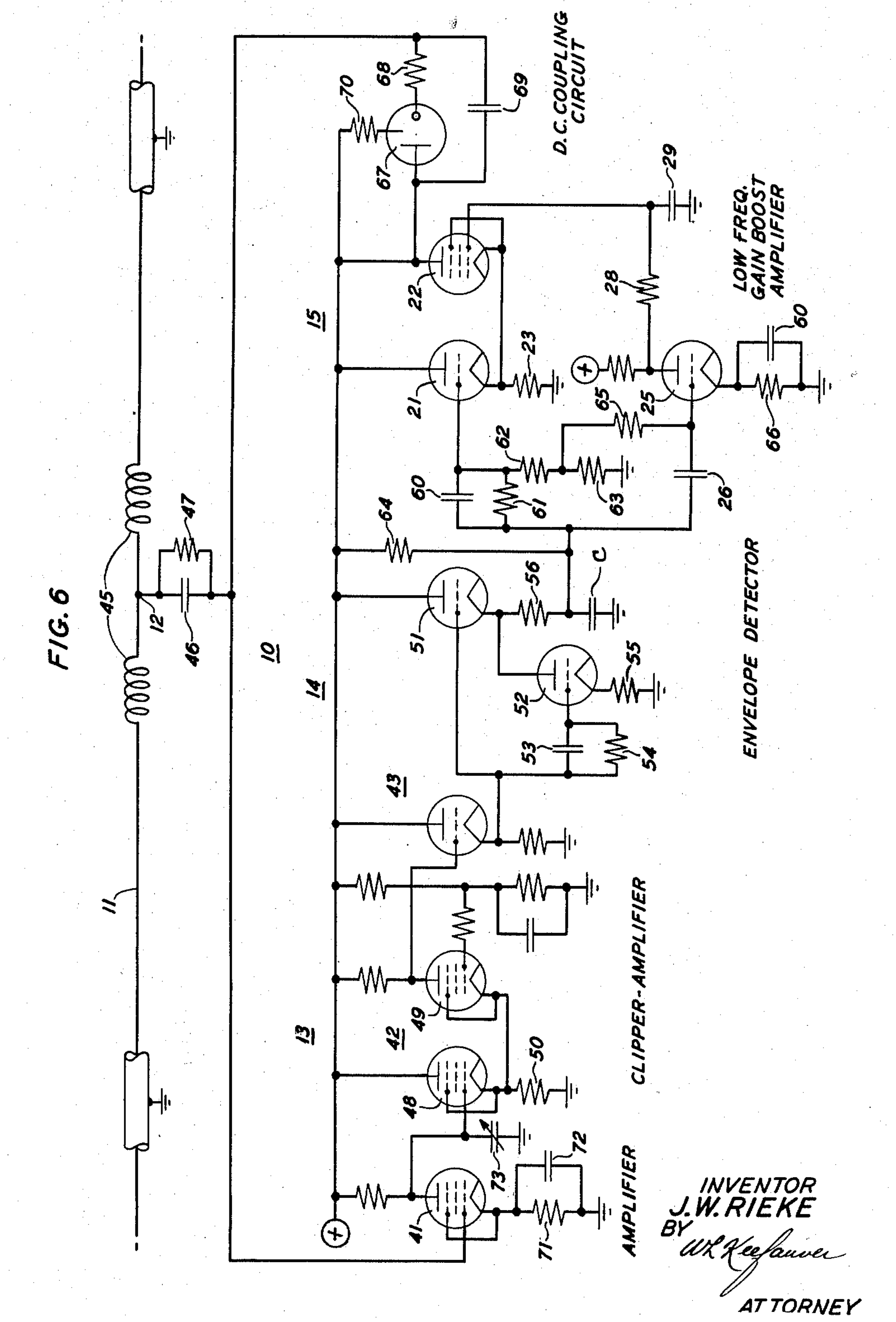
Fig. 6 is a detailed circuit diagram of a clamper employing principles of the invention.

A complete shunt clamper of the feedback type which illustrates features of the invention is illustrated in Fig. 6. This clamper may be used, for example, in the receiving terminals of a video transmission system, although it could also be used in carrier systems.

In brief, the clamper is a feedback device which bridges or operates in shunt with a 75-ohm transmission line 11. The television signal at the bridging point 12 is amplified by an amplifier 41, and the picture portion of the video wave is removed by a clipper 42. The clipper also amplifies the remaining signal, namely, the synchronizing pulses containing the distortion information, and applies it by way of a cathode follower stage to an envelope detector 14. The detector output appearing across the condenser C represents the amplified distortion envelope described by the tips of the synchronizing pulses. The detected envelope is then returned to the bridging point 12 and the input of amplifier 41 by means of a coupling stage 15 which is similar to the one illustrated in Fig. 4. The feedback envelope is about equal in amplitude and opposite in phase to the original distortion envelope so substantial cancellation of the distortion is achieved on the line 11 at the bridging point 12.

In more detail, a television signal which has been subjected to low frequency impairments of one kind or another during preceding transmission appears on a 75-ohm coaxial cable 11. The input of the clamper amplifier is bridged on the coaxial line at the junction of two coils 45, the purpose of which is to build out the stray capacitance associated with the line to provide smooth transmission at the higher video frequencies. These coils, plus stray capacities, form a low pass filter having a cut-off frequency which is high compared to the video band. The condenser 46 and shunt resistor 47 couple the bridging point to the input of the clamper amplifier and also serve as a D.-C. coupling impedance in the clamper D.-C. feedback circuit. The resistor 47 provides the necessary amount of direct-current coupling for regulating the grid bias requirements of the clamper circuit vacuum tubes.

The composite television signal, therefore, appears on the control grid of the amplifier 41 and is amplified by this tube. The amplified and inverted signal is applied to the grid of a second tube 48 which, cathode-coupled to a third tube 49, functions as a clipper to remove the picture portion of the signal and pass only the synchronizing pulses. The common cathode resistor 50 provides the coupling between the tubes 48 and 49 and acts on the sum of the two cathode currents of these tubes to provide a differential clipping characteristic. The biases on the grids of these tubes are adjusted so that the tube 48 conducts only during the synchronizing pulses. During the picture intervals between these pulses, tube 49 conducts the total current, and tube 48 is cut off. As a result, for normal level signals, the video is completely clipped and only the synchronizing pulses reach the plate of tube 49 amplified by the voltage gain provided by this stage.

The positive synchronizing pulses drive a cathode follower stage 43 which functions to step down impedance with little or no loss of voltage to provide the drive for the envelope detector 14. Since the amplifier stages are linear in the region of the synchronizing pulse tips, there is no clipping of the distortion envelope carried by the pulses.

The envelope detector 14 is a device which derives as closely as possible the low frequency distortion wave form present in the television signal. The detector accomplishes this by varying the charge on a condenser C so that its voltage follows the change in level from one synchronizing pulse tip to the next. This detector is disclosed in a copending joint application of A. Slocum and mine, Serial No. 449,144, filed August 11, 1954.

Basically, the detector is of the infinite impedance type comprising a triode 51 having a condenser C connected as its cathode load impedance. However, instead of the customary resistor which shunts this capacitor in detectors of this type, there is substituted a condenser discharge tube 52.

In general, the synchronizing pulses applied to the detector tube 51 are also applied to the discharge tube 52 so that during the synchronizing pulse intervals the plate resistance of tube 52 is lowered, causing the output condenser to discharge to the tip amplitude of the synchronizing pulses. During the interval between synchronizing pulses, the discharge tube 52 is cut off so that the condenser C will hold its charge until the next pulse arrives. By virtue of this action, the detector output voltage is rendered relatively insensitive to changes in pulse duration or pulse separation such as occurs, for example, between the video horizontal and vertical synchronizing pulses and the equalizing pulses. This is achieved by permitting the condenser to charge or discharge only during the intervals of these synchronizing pulses and by balancing the effective rate of charge removal with the charging rate so that in the absence of distortion the net charge applied to condenser will be zero.

The operation of this specific circuit is as follows: The potential on the condenser C holds the cathode of the detector tube 51 well above its grid potential between pulses as determined by the cathode potential of the driving tube 43. The discharge tube 52 is held at cut-off also by the potential across its grid coupling condenser 53 and parallel resistor 54. During the synchronizing pulse interval, tube 52 is driven to saturation and caused to draw grid current so that the condenser 53 charge is maintained. In effect, this parallel resistor and capacitor act as a series battery to compensate for the D.-C. potential between the detector and discharge tubes 51 and 52, noting that they each receive their input from the cathode of the driving tube 43.

Therefore, during the interval between pulses, both tubes 51 and 52 are cut off as a result of their steady-state bias. Upon the arrival of a synchronizing pulse at the cathode of the drive tube 43, the discharge tube 52 conducts first, partially discharging the output condenser C. When the pulse amplitude increases sufficiently to raise the grid potential of the detector tube 51 to the conduction value of bias with respect to its cathode, this tube also conducts, recharging the condenser C. In the presence of distortion, the rate of charge and discharge is proportioned so that before the pulse expires, the condenser voltage reaches the distortion level carried by the input pulse.

The discharge tube 52 may be thought of as a resistance which is switched in and out of the circuit, being switched in only in the presence of synchronizing pulses. As mentioned above, the action of this tube is necessary to permit the voltage of condenser C to follow the level of the synchronizing pulse tips during that portion of the distortion envelope when the levels of the pulse tips are successively decreasing. If a resistor were used instead, the rate of discharge for the condenser would be too slow to permit the detector to follow decreasing distortion envelopes of any but the lowest frequencies. In addition, this tube reduces charge distortion during the vertical synchronizing period. Fig. 6 shows a triode employed for the discharge tube. Alternatively, tetrodes or pentodes might be employed for either or both tubes 51 and 52.

The clamper articles cited above discusses the choice of a clamper time constant. The desired time constant determines the time constant of the detector which, in the present circuit, is determined primarily by resistor 56, the characteristic of the detector tube 51, and the magnitude of condenser C. Since the detector is in the feedback circuit, its time constant is $1/\mu\beta$ times the desired clamping time constant.

Cathode degeneration is introduced into the discharge tube 52 by resistor 55 for several reasons. In the first place, it reduces the gain of this tube so that transmission of the distortion on the tips of synchronizing pulses is primarily by the upper tube 51. If the gains of these two tubes were exactly balanced, the condenser C would receive no net charge from any low frequency distortion. In the second place, the two tubes represent amplifiers in the clamper feedback circuit. From the nature of their connections, the detector tube 51 is a negative feedback element and the discharge tube 52 a positive feedback element. The net feedback must, of course, be negative for circuit stability. This degeneration, therefore, is necessary to prevent circuit oscillations.

The coupling amplifiers 15 are substantially the same as those described with reference to Fig. 4. The detected distortion on the condenser C is direct-current coupled to the grid of tube 21 by a voltage divider comprising resistors 61, 62, 63. Condenser 60 couples the higher frequencies to the grid of this tube. This divider permits some of the charge on the condenser C to leak off, but this discharge is compensated for by the positive bias applied to the condenser through the resistor 64 which replaces the charge at the same rate. As in Fig. 4, the envelope is also A.-C. coupled to a second tube 25 which provides a low frequency gain boost over a band determined at its lower end by the coupling capacitor 26 and grid leak resistors 65, 63 and at its upper end by the resistor 28 and capacitor 29. This stage, therefore, contributes to the loop feedback characteristic a second six-decibel per octave cut-off over a range of low frequencies in addition to the one produced by the detector and tends to reduce residual distortion in the resultant transmitted signal. This circuit, in effect, attenuates the step character of the detected envelope by attenuating higher frequencies which arise from the quantized nature of the signal. Resistor 66 adds a small amount of degeneration to tube 25. This resistor is bypassed by a condenser 60 to increase the gain boost still further.

The envelope current appearing in the output of the output tube 22 is applied to the line terminations by a gas diode 67 and series resistor 68 which are shunted by a condenser 69. The starting anode is connected to positive battery through a dropping resistor 70 and provides the potential gradient required for initial ionization of the gas. This tube provides the close D.-C. coupling from output to input required for bias stabilization within the clamper loop. Since the gas diode is a low frequency device, the bypass condenser 69 is needed to provide coupling for the higher frequencies.

This output coupling arrangement transfers the low frequency currents of the mixing tube to the line terminations. These envelope currents induce in the terminations the envelope voltage of proper phase and amplitude to suppress the original distortion.

High frequency peaking in the feedback circuit is provided in the first stage. A resistor 71 provides local feedback for tube 41, but condenser 72 reduces this degeneration at high frequencies. The peaking thus provided is purposely made slightly greater than required and is then reduced by adjustment of a variable capacitor 73 which is connected from the plate of tube 41 to ground. This added capacitance counteracts the peaking by lowering the interstage cut-off frequency and is adjusted for optimum transmission of the synchronizing pulses.

Since the clamper is essentially a feedback amplifier, the usual criteria for stability must be maintained. Adequate gain and phase margins are provided in the gain crossover regions of the feedback characteristic. From the standpoint of stability, the low frequency gain boost in the most important operating frequency range is obtained without exceeding the required phase and gain margins at the higher frequencies.

The characteristic for the clamper just described is curve C in Fig. 5. Were the condenser 46 omitted or were the input and output lines separately coupled through individual capacitors to the clamper, its characteristic would be curve D. For a specific application, the improvement represented by these characteristics, particularly in the region from 60 to 2000 cycles per second, satisfied performance requirements. Improvement may, however, be extended to higher frequencies by adjusting the cut-off in the low frequency gain boost provided by amplifier 25, for example, by adjusting either capacitor 29 or 60. Theoretically, the benefits of clamping may be extended up to one-half line frequency although stability criterion will, in general, limit significant interference reduction to several thousand cycles per second.

Although the invention has been described with reference to specific embodiments, these should not be deemed restrictive since other embodiments and modifications will readily occur to one skilled in the art. For example, the clamper may be used with balanced video transmission lines rather than unbalanced coaxial circuits, as shown here. For balanced operation, of course, push-pull or balanced input and output stages are required.

What is claimed is:

1. In combination, a source of signal voltage of the type which has a first component with regularly recurring portions at a nominally fixed amplitude and which may have a second component comprising a low frequency wave caused by distortion or interference, an output circuit for said signal wave, a transmission path interconnecting said source and said output, and a clamper for reducing said low frequency distortion, said clamper comprising a first amplifier having its input bridged on said transmission path, an envelope detector connected to the output of said first amplifier for deriving a wave whose amplitude follows the amplitude variations of said recurring portions, and means for coupling said derived wave back to the input of said first amplifier in phase opposition with said low frequency wave, said coupling means comprising a pair of parallel paths, one of said paths comprising means for equally transmitting substantially all the significant frequency components of said derived wave and the other of said paths comprising means for amplifying the frequency components of said derived wave which are equal to or less than one half the repetition frequency of said regularly recurrent portions of said signal voltage relative to higher frequency components of said derived wave.

2. In a television system, a clamper for reducing low frequency distortion of a television signal comprised of synchronizing pulses and picture information, said synchronizing pulses in the absence of said distortion having a constant amplitude, said clamper comprising an amplifier having a feedback circuit including an envelope detector for detecting the low frequency variations in the amplitude of said synchronizing pulses, and means for coupling the output of said envelope detector to the input of said amplifier with the proper phase and amplitude to cancel said distortion, said last-named means comprising a first amplifier having its input direct-current coupled to the output of said detector, a second amplifier having its input A.-C. coupled to the output of said detector, means for reducing the gain of said second amplifier for frequencies above half the synchronizing pulse repetition frequency, and means for combining the outputs of said first amplifier and said second amplifier.

3. In combination, a source of television signals which have recurrent pulses at a nominally fixed amplitude and which may have low frequency amplitude variations due to distortion or interference, output terminals for said signal source, a transmission path interconnecting said source and said output terminals, and a clamper for reducing said low frequency amplitude variations, said clamper comprising a first amplifier device having its input bridged on said line, an envelope detector connected to the output of said first amplifier for deriving from the variation in amplitude of said recurrent pulses a quantized replica of said low frequency amplitude variations, and a coupling circuit for applying the output of said detector to the input of said first amplifier in phase opposition to said low frequency amplitude variations, said coupling circuit comprising a second and third amplifier device, means for connecting said second amplifier device in cathode follower configuration, means for connecting said third amplifier device as an amplifier, a direct-current coupling circuit for applying the output of said envelope detector to said second amplifier device, means for also applying the output of said envelope detector to said third amplifier device, band shaping means for limiting the gain of said third amplifier device to a band of frequencies below one half the repetition frequency of said recurrent pulses, and means for combining the outputs of said second and third amplifier devices.

References Cited in the file of this patent

UNITED STATES PATENTS

| | | |
|---|---|---|
| 2,630,486 | Rieke | Mar. 3, 1953 |

OTHER REFERENCES

"Clampers in Video Transmission," Doba et al., 69 Trans. A. I. E. E. 477, 1950 (Fig. 16).